US012595209B2

(12) United States Patent
Grassl et al.

(10) Patent No.:  US 12,595,209 B2
(45) Date of Patent:      Apr. 7, 2026

(54) MIXTURE COMPRISING GLYOXYLIC ACID OR CONDENSATION OR ADDITION PRODUCTS THEREOF

(71) Applicant: BASF SE, Ludwigshafen am Rhein (DE)

(72) Inventors: Harald Grassl, Trostberg (DE); Joachim Dengler, Trostberg (DE); Julien Bizzozero, Origlio (CH); Alexander Schöbel, Trostberg (DE)

(73) Assignee: BASF SE, Ludwigshafen Am Rhein (DE)

( * ) Notice: Subject to any disclaimer, the term of this patent is extended or adjusted under 35 U.S.C. 154(b) by 945 days.

(21) Appl. No.: 17/433,757

(22) PCT Filed: Feb. 14, 2020

(86) PCT No.: PCT/EP2020/053931
§ 371 (c)(1),
(2) Date: Aug. 25, 2021

(87) PCT Pub. No.: WO2020/173723
PCT Pub. Date: Sep. 3, 2020

(65) Prior Publication Data
US 2022/0135478 A1      May 5, 2022

(30) Foreign Application Priority Data

Feb. 27, 2019    (EP) ..................................... 19159761

(51) Int. Cl.
*C04B 24/04*       (2006.01)
*C04B 22/10*       (2006.01)
*C04B 24/02*       (2006.01)
*C04B 24/26*       (2006.01)
*C04B 28/04*       (2006.01)

(52) U.S. Cl.
CPC ............ *C04B 24/04* (2013.01); *C04B 22/103* (2013.01); *C04B 24/02* (2013.01); *C04B 24/2641* (2013.01); *C04B 28/04* (2013.01)

(58) Field of Classification Search
None
See application file for complete search history.

(56) References Cited

U.S. PATENT DOCUMENTS

| | | | |
|---|---|---|---|
| 4,430,469 A | 2/1984 | Burge et al. | |
| 4,617,205 A | 10/1986 | Darken | |
| 6,555,683 B1 | 4/2003 | Weichmann et al. | |

| | | | | |
|---|---|---|---|---|
| 2006/0169183 A1* | 8/2006 | Waser | .................... | C04B 28/06 106/806 |
| 2012/0312317 A1 | 12/2012 | Mannozzi | | |
| 2016/0145745 A1 | 5/2016 | Wu et al. | | |

FOREIGN PATENT DOCUMENTS

| | | | | |
|---|---|---|---|---|
| CA | 2172004 A1 | 9/1996 | | |
| CH | 686186 A5 | 1/1996 | | |
| CN | 102992683 A | 3/2013 | | |
| DE | 3544932 A1 | 7/1986 | | |
| DE | 4217181 A1 * | 11/1993 | ........... | C04B 24/305 |
| DE | 4411797 A1 | 10/1995 | | |
| DE | 20217780 U1 | 4/2003 | | |
| EP | 0753488 A2 | 1/1997 | | |
| EP | 0894811 A1 | 2/1999 | | |
| EP | 1851256 A1 | 11/2007 | | |
| EP | 2463314 A1 | 6/2012 | | |
| FR | 2907334 A1 | 4/2008 | | |
| JP | 01-096105 A | 4/1989 | | |
| JP | 2003-026528 A | 1/2003 | | |
| KR | 10-2015-0050344 A | 5/2015 | | |
| WO | 2008/012438 A2 | 1/2008 | | |
| WO | 2009/103579 A1 | 8/2009 | | |
| WO | 2017/212044 A1 | 12/2017 | | |
| WO | 2017/212045 A1 | 12/2017 | | |

OTHER PUBLICATIONS

Machine Translation of DE-4217181 (Year: 1993).*
PubChem Glycerol-carbonate (Compound) (pubchem.ncbi.nih.gov/compound/Glycerol-carbonate which has a creation date of Oct. 25, 2006). (Year: 2006).*
International Search Report and Written Opinion received for PCT Patent Application No. PCT/EP2020/053931, mailed on May 12, 2020, 9 pages.
European Search Report for EP Patent Application No. 19159761.6, Issued on Aug. 14, 2019, 5 pages.
Plank et al., "Modification of the molar anionic charge density of acetone-formaldehyde-sulfite dispersant to improve adsorption behavior and effectiveness in the presence of CaAMPS®-co-NNDMA cement fluid loss polymer", Journal of Applied Polymer Science, vol. 111, Issue 4, Nov. 6, 2008, pp. 2018-2024.
Ramachandran et al., "Chapter 7: Superplasticizers", Concrete Admixtures Handbook—Properties, Science and Technology, 2nd Edition, Dec. 31, 1996, pp. 410-517.

* cited by examiner

*Primary Examiner* — Michael Forrest
(74) *Attorney, Agent, or Firm* — Faegre Drinker Biddle & Reath LLP

(57) ABSTRACT

The present application relates to a mixture comprising at least one compound A selected from glyoxylic acid, salts thereof, and condensation or addition products of glyoxylic acid or salts thereof; and at least one polyhydroxy compound B. Furthermore, the present application relates to a construction material composition comprising said mixture, and to the use of said mixture for modifying the hardening of inorganic binder containing building material formulations, and/or for producing building products.

18 Claims, No Drawings

MIXTURE COMPRISING GLYOXYLIC ACID OR CONDENSATION OR ADDITION PRODUCTS THEREOF

CROSS-REFERENCE TO RELATED APPLICATIONS

This application is a national stage application (under 35 U.S.C. § 371) of PCT/EP2020/053931, filed Feb. 14, 2020, which claims benefit of European Application No. 19159761.6, filed Feb. 27, 2019, both of which are incorporated herein by reference in their entirety.

The present application relates to a mixture comprising at least one compound A selected from glyoxylic acid, salts thereof, condensation or addition products of glyoxylic acid or salts thereof; and mixtures thereof, and at least one polyhydroxy compound B and/or salts or esters thereof. Furthermore, the present application relates to a construction material composition comprising said mixture, and to the use of said mixture for modifying the hardening of inorganic binder containing building material formulations, and/or for producing building products.

It is known in the art that additives may be added to aqueous slurries or pulverulent inorganic binders for improving their workability, i.e. kneadability, spreadability, sprayability, pumpability, or flowability. For example, set control agents or retarders may be used as an additive to delay the hydration reaction and improve the workability.

DE 42 17 181 A1 discloses condensation products of melamine and glyoxylic acids as additives for hydraulic binders. WO 2017/212045 A1 discloses bisulfite adducts of glyoxylic acid as additives for inorganic binders and their use for modification of the hardening of inorganic binder containing building material formulations and/or for producing building products. WO 2017/212044 A1 discloses a mixture comprising an α-hydroxy-carboxylic unit, an α-hydroxysulfonic acid unit or an α-carbonyl-carboxylic acid unit, and a water-soluble organic carbonate, and its use as a hydration control additive.

However, it has been found that the compressive strength of the building products obtained by using the prior art additives is not sufficient for certain applications. Accordingly, there remains a need for additives for improving the workability of inorganic binders, wherein the compressive strength of the building material is increased.

The problem underlying the invention was therefore to provide an additive, which solves the problems of the prior art. In particular, the additive should enable a sufficient open time (time until initial setting), a good processability (workability) during said open time, and fast setting of a construction material composition, while at the same time providing an improved compressive strength of the hardened building product. In this connection, it was a further object to improve the early compressive strength (typically measured after 3 hours) as well as the final compressive strength (typically measured after 24 hours).

The problem is solved by a mixture comprising
a) at least one compound A selected from glyoxylic acid, salts thereof, condensation or addition products of glyoxylic acid or salts thereof, and mixtures thereof; and
b) at least one polyhydroxy compound B and/or salts or esters thereof.

In particular, the problem is solved by a construction material composition comprising at least one inorganic binder and a mixture comprising a) at least one compound A selected from glyoxylic acid, salts thereof, condensation or addition products of glyoxylic acid or salts thereof, and mixtures thereof; and
b) at least one polyhydroxy compound B and/or salts or esters thereof, wherein the polyhydroxy compound B is selected from polyalcohols with a carbon to oxygen ratio of from $C/O \geq 1$ to $C/O \leq 1.5$ and mixtures thereof.

It has surprisingly been found that components a) and b) of the mixture of the invention provide excellent retarding action if used as an additive in a construction material composition, while at the same time providing a high compressive strength of the resulting building product. In particular, the early as well as the final compressive strength could be improved in comparison to the prior art.

The present invention in particular relates to the following embodiments.

In one preferred embodiment of the mixture or the construction material composition of the invention, the compound A is selected from

A1)

A2)

and
A3) an amine-glyoxylic acid condensate selected from the group consisting of a melamine-glyoxylic acid condensate, an urea-glyoxylic acid condensate, a melamineurea-glyoxylic acid condensate and a polyacrylamide-glyoxylic acid condensate; and mixtures thereof;
wherein X is in each case independently selected from H or a cation equivalent $K_a$,
wherein K is an alkali metal, alkaline earth metal, zinc, iron, aluminium, ammonium, or a phosphonium cation, and wherein a is $1/n$, wherein n is the valence of the cation.

In one preferred embodiment of the mixture or the construction material composition of the invention, the polyhydroxy compound B is selected from polyalcohols with a carbon to oxygen ratio of from $C/O \geq 1$ to $C/O \leq 1.25$, and mixtures thereof.

In one preferred embodiment of the mixture or the construction material composition of the invention, the polyhydroxy compound B is selected from sugar alcohols and their condensation products, alkanolamines and their condensation products, carbohydrates, pentaerythritol, trimethylolpropane, and mixtures thereof, and is preferably glycerol.

In one preferred embodiment of the mixture or the construction material composition of the invention, the polyhydroxy compound B has a molecular weight of from 62 g/mol to 25000 g/mol, preferably from 62 g/mol to 10000 g/mol and most preferably from 62 g/mol to 1000 g/mol.

In one preferred embodiment of the mixture or the construction material composition of the invention, the compound(s) A and the compound(s) B are present in a weight ratio of from 10:1 to 1:10, preferably from 1:1 to 1:8.

In one preferred embodiment of the mixture or the construction material composition of the invention, the mixture further comprises c) at least one compound C selected from
   (i) a borate source,
   (ii) a carbonate source, wherein the carbonate source is selected from inorganic carbonates and organic carbonates,
   and mixtures thereof.

In one preferred embodiment of the mixture or the construction material composition of the invention, the compound C is an inorganic carbonate, which is preferably selected from potassium carbonate, sodium carbonate, lithium carbonate, magnesium carbonate, and mixtures thereof.

In one preferred embodiment of the mixture or the construction material composition of the invention, the mixture further comprises d) at least one compound D, which is selected from
   polycarboxylic acids or salts thereof whose milliequivalent number of carboxyl groups is 5.00 meq/g or higher, preferably 5.00 to 15.00 meq/g, assuming all the carboxyl groups to be in unneutralized form;
   phosphonates which comprise two or three phosphonate groups and no carboxyl groups; and
   $\alpha$-hydroxy carboxylic acids or salts thereof;
   a polyhydroxy compound with a carbon to oxygen ratio of C/O>1.5;
   and mixtures thereof.

In one preferred embodiment of the mixture or the construction material composition of the invention, the compound D is a $\alpha$-hydroxy carboxylic acids or salts thereof, preferably gluconic acid or a salt thereof.

In one preferred embodiment of the mixture or the construction material composition of the invention, the mixture further comprises e) at least one dispersant, which is selected from
   comb polymers having a carbon-containing backbone to which are attached pendant cement-anchoring groups and polyether side chains,
   non-ionic comb polymers having a carbon-containing backbone to which are attached pendant hydrolysable groups and polyether side chains, the hydrolysable groups upon hydrolysis releasing cement-anchoring groups,
   sulfonated melamine-formaldehyde condensates,
   lignosulfonates,
   sulfonated ketone-formaldehyde condensates,
   sulfonated naphthalene-formaldehyde condensates,
   phosphonate containing dispersants, preferably the phosphonate containing dispersants comprise at least one polyalkylene glycol unit,
   cationic (co)polymers, and
   mixtures thereof.

In one preferred embodiment of the construction material composition of the invention, the inorganic binder is a hydraulic binder, which is selected from Portland cement, calcium aluminate cement, sulfoaluminate cement, and mixtures thereof.

In one preferred embodiment of the construction material composition of the invention, the inorganic binder is a latent hydraulic binder, which is preferably blast furnace slag.

Further, the present invention relates to the use of the mixture of the invention for modifying the hardening of inorganic binder containing building material formulations, and/or for producing building products.

The present invention in particular relates to a mixture comprising a) at least one compound A selected from an amine-glyoxylic acid condensate selected from the group consisting of a melamine-glyoxylic acid condensate, an urea-glyoxylic acid condensate, a melamine-urea-glyoxylic acid condensate, a polyacrylamide-glyoxylic acid condensate, and mixtures thereof; and b) at least one polyhydroxy compound B and/or salts or esters thereof, wherein the polyhydroxy compound B is selected from polyalcohols with a carbon to oxygen ratio of from C/O≥1 to C/O≤1.5 and mixtures thereof.

Further preferred embodiments of the invention, which are preferred alone as well as in combination, are described hereinafter. The preferred embodiments in each case refer to the mixture as well as the construction material composition of the invention, as the mixture is part of the construction material composition.

Component a) is at least one compound A selected from glyoxylic acid or salts thereof, condensation or addition products of glyoxylic acid or salts thereof, and mixtures thereof.

Glyoxylic acid has the following structure:

As used herein, salts of glyoxylic acid include the alkali, alkaline earth, zinc, iron, aluminium, ammonium, and phosphonium salts of glyoxylic acid. As used herein, addition products of glyoxylic acid or salts thereof refer to products, which are obtainable by reacting a nucleophilic compound with the $\alpha$-carbonyl group of glyoxylic acid, so as to obtain $\alpha$-substituted $\alpha$-hydroxyacetic acid or a salt thereof as an adduct. As used herein, condensation products of glyoxylic acid or salts thereof refer to condensation products obtainable by reacting a compound containing at least one amino or amido group with the $\alpha$-carbonyl group of glyoxylic acid, such that water is set free. Examples of compounds containing at least one amino or amido group include urea, thiourea, melamine, guanidine, acetoguanamine, benzoguanamine and other acyl-guana-mines, polyvinylamine and polyacrylamide.

In one embodiment, compound A is glyoxylic acid or a salt thereof. Preferably, compound A is a compound A1 of the following formula:

wherein X is selected from H or a cation equivalent $K_a$, wherein K is an alkali metal, alkaline earth metal, zinc, iron, aluminium, ammonium, or a phosphonium cation, and wherein a is 1/n, wherein n is the valence of the cation. More preferably, X is H or $K_a$, wherein K is an alkali metal. Even more preferably K is lithium, sodium or potassium. It is to be understood that also mixed salts are possible. In a particularly preferred embodiment X is sodium or potassium or a mixture thereof.

In another embodiment, compound A is an addition product of glyoxylic acid or a salt thereof. Preferably, compound A is a compound A2 of the following formula:

wherein X is in each case independently selected from H or a cation equivalent $K_a$, wherein K is an alkali metal, alkaline earth metal, zinc, iron, aluminium, ammonium, or a phosphonium cation, and wherein a is 1/n, wherein n is the valence of the cation. More preferably, X is H or $K_a$, wherein K is an alkali metal. Even more preferably K is lithium, sodium or potassium. It is to be understood that also mixed salts are possible. In a particularly preferred embodiment X is independently sodium or potassium or a mixture thereof.

In yet another embodiment, compound A is a condensation product of glyoxylic acid or a salt thereof. Preferably, compound A is a compound A3 selected from the group consisting of a melamine-glyoxylic acid condensate, an urea-glyoxylic acid condensate, a melamine-urea-glyoxylic acid condensate and a polyacrylamide-glyoxylic acid condensate. Preferably, the amine-glyoxylic acid condensate is an urea-glyoxylic acid condensate.

The amine-glyoxylic acid condensates are obtainable by reacting glyoxylic acid with a compound containing aldehyde-reactive amino or amido groups. The glyoxylic acid can be used as an aqueous solution or as glyoxylic acid salts, preferably glyoxylic acid alkaline metal salts. Likewise, the amine compound can be used as salt, for example as guanidinium salts. In general, the amine compound and the glyoxylic acid are reacted in a molar ratio of 0.5 to 2 equivalents, preferably 1 to 1.3 equivalents, of glyoxylic acid per aldehyde-reactive amino or amido group. The reaction is carried out at a temperature of 0 to 120° C., preferably 25 to 105° C., most preferably 50 to 105° C. The pH value is preferably from 0 to 8. The viscous products obtained in the reaction can be used as such, adjusted to a desired solids content by dilution or concentration or evaporated to dryness by, e.g., spray-drying, drum-drying, or flash-drying.

In general, the amine-glyoxylic acid condensates have molecular weights in the range of from 500 to 25000 g/mol, preferably 1000 to 10000 g/mol, particularly preferred 1000 to 5000 g/mol. The molecular weight is measured by the gel permeation chromatography method (GPC) as indicated in detail in the experimental part.

Thus, in one embodiment, the compound A is selected from

A1)

-continued

A2)

and

A3) an amine-glyoxylic acid condensate selected from the group consisting of a melamine-glyoxylic acid condensate, an urea-glyoxylic acid condensate, a melamineurea-glyoxylic acid condensate and a polyacrylamide-glyoxylic acid condensate;
and mixtures thereof;
wherein X is in each case independently selected from H or a cation equivalent $K_a$,
wherein K is an alkali metal, alkaline earth metal, zinc, iron, aluminium, ammonium, or a phosphonium cation, and wherein a is 1/n, wherein n is the valence of the cation.

In a preferred embodiment, the compound A is selected from

A1)

A2)

and

A3) an urea-glyoxylic acid condensate;
and mixtures thereof;
wherein X is in each case independently selected from H or a cation equivalent $K_a$,
wherein K is an alkali metal, alkaline earth metal, zinc, iron, aluminium, ammonium, or a phosphonium cation, and wherein a is 1/n, wherein n is the valence of the cation,
and wherein preferably X is in each case independently selected from H and alkali metals, in particular from sodium, potassium, and mixtures thereof.

Component b) is at least one polyhydroxy compound B and/or salts or esters thereof. The polyhydroxy compound B is defined hereinafter. The preferred embodiments are relevant alone as well as in combination.

As used herein, the term polyhydroxy compound refers to an organic compound comprising at least two, preferably at least three hydroxy groups. The carbon chain of the compound may be linear or cyclic. Preferably the polyhydroxy compound only comprises carbon, oxygen, hydrogen, and optionally nitrogen atoms. In a preferred embodiment, the polyhydroxy compound according to the invention does not comprise a carboxy group C(=O)O as functional group. In particular, the polyhydroxy compound does not comprise a carboxylic acid group C(=O)OH has functional group.

In a preferred embodiment, the polyhydroxy compound B is selected from polyalcohols with a carbon to oxygen ratio of from C/O≥1 to C/O≤1.5, more preferably from C/O≥1 to C/O≤1.25, and mixtures thereof.

In another preferred embodiment, the polyhydroxy compound B has a molecular weight of from 62 g/mol to 25000 g/mol, preferably from 62 g/mol to 10000 g/mol and most preferably from 62 g/mol to 1000 g/mol.

In another preferred embodiment, the polyhydroxy compound B is selected from sugar alcohols and their condensation products, carbohydrates, pentaerythritol, trimethylolpropane, and mixture thereof.

As used herein, sugar alcohols preferably include sugar alcohols based on $C_3$-$C_{12}$-sugar molecules. Preferred sugar alcohols include glycerol, threitol, erythritol, xylitol, sorbitol, inositol, mannitol, maltitol, and lactitol. A particularly preferred sugar alcohol is glycerol having the following formula:

As used herein, the term carbohydrate refers to sugars, starch, and cellulose. Preferably, the term carbohydrate is intended to refer to sugars, i.e. mono- and disaccharides. Preferred carbohydrates according to the invention include glucose, fructose, sucrose, and lactose.

In a more preferred embodiment of the invention, the polyhydroxy compound B is selected from glycerol, threitol, erythritol, xylitol, sorbitol, inositol, mannitol, maltitol, lactitol, pentaerythritol, trimethylolpropane, and mixture thereof. In a particularly preferred embodiment, the polyhydroxy compound B is glycerol.

As indicated above, the polyhydroxy compound B may also be used in the form of the salt or ester thereof.

Suitable salts include metal salts such as alkali metal, alkaline earth metal, zinc, aluminium and iron salts, ammonium salts, and phosphonium salts. Preferred are metal salts, in particular alkali or earth alkali metal salts. Especially preferred are calcium salts.

Suitable esters include saturated or unsaturated $C_1$-$C_{20}$-carboxylic acid esters, preferably $C_2$-$C_{10}$-carboxylic acid esters, such as acetic acid esters. The carboxylic acid moiety may be unsubstituted or substituted by one or more substituents selected from halogen, OH, and =O.

Thus, in a particularly preferred embodiment of the invention, the mixture comprises as component a)

a compound A selected from

A1)

-continued

A2)

and

A3) an urea-glyoxylic acid condensate;

and mixtures thereof;

wherein X is in each case independently selected from H or a cation equivalent $K_a$;

wherein K is an alkali metal, alkaline earth metal, zinc, iron, aluminium ammonium, or a phosphonium cation, and wherein a is 1/n, wherein n is the valence of the cation, and wherein preferably X is in each case independently selected from H and alkali metals, in particular from sodium, potassium, and mixtures thereof.

and as component b)

glycerol.

In a preferred embodiment, the mixture of the invention comprises the compound(s) A and the compound(s) B as defined in detail above in a weight ratio of from 10:1 to 1:10, preferably from 1:1 to 1:8. In other words, the weight ratio of component a) to component b) is in general in the range of from 10:1 to 1:10, preferably from 1:1 to 1:8.

In further embodiments of the invention, the mixture comprises additional components as described hereinafter. It is to be understood that each additional component may be present as the sole additional component or in combination with other additional components as defined herein.

In one embodiment, the mixture of the invention further comprises c) at least one compound C selected from
    (i) a borate source,
    (ii) a carbonate source, wherein the carbonate source is selected from inorganic carbonates and organic carbonates,
    and mixtures thereof.

The borate source usually comprises a rapidly soluble, inexpensive, borate compound. Suitable borate sources include borax, boric acid, and sodium tetraborate.

The carbonate source may be an inorganic carbonate having an aqueous solubility of 0.1 $gL^{-1}$ or more. The aqueous solubility of the inorganic carbonate is determined in water (starting at pH 7) at 25° C. These characteristics are well known to those skilled in the art. The inorganic carbonate may be selected from alkaline metal carbonates such as potassium carbonate, sodium carbonate or lithium carbonate, and alkaline earth metal carbonates satisfying the required aqueous solubility, such as magnesium carbonate. It is also possible to use guanidine carbonate as an inorganic carbonate, as well as sodium hydrogencarbonate and potassium hydrogencarbonate.

Alternatively, the carbonate source is selected from organic carbonates. "Organic carbonate" denotes an ester of carbonic acid. The organic carbonate is hydrolyzed in the presence of the cementitious system to release carbonate ions. In an embodiment, the organic carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate. Mixtures of inorganic carbonates and organic carbonates can as well be used.

In a preferred embodiment, the compound C is an inorganic carbonate, which is preferably selected from potassium carbonate, sodium carbonate, lithium carbonate, magnesium carbonate, and mixtures thereof.

The weight ratio of component a) to component c) is in general in the range from about 10:1 to about 1:100, preferably about 5:1 to about 1:50 or about 1:1 to about 1:30.

In one embodiment, the mixture of the invention further comprises d) at least one compound D, which is selected from polycarboxylic acids or salts thereof whose milliequivalent number of carboxyl groups is 5.00 meq/g or higher, preferably 5.00 to 15.00 meq/g, assuming all the carboxyl groups to be in unneutralized form;

phosphonates which comprise two or three phosphonate groups and no carboxyl groups; and $\alpha$-hydroxy carboxylic acids or salts thereof;

a polyhydroxy compound with a carbon to oxygen ratio of C/O>1.5;

and mixtures thereof.

Suitable polycarboxylic acids are low molecular weight polycarboxylic acids (having a molecular weight of, e.g., 500 or lower), in particular aliphatic polycarboxylic acids, such as oxalic acid, malonic acid, succinic acid, glutaric acid, adipic acid, pimelic acid, fumaric acid, maleic acid, itaconic acid, citraconic acid, mesaconic acid, and malic acid.

Phosphonoalkylcarboxylic acids, such as 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, or 1,2-phosphonoethane-2-dicarboxylic acid; amino carboxylic acids, such as ethylenediamine tetra acetic acid, or nitrilotriacetic acid; polymeric carboxylic acids, such as homopolymers of acrylic acid, homopolymers of methacrylic acid, polymaleic acid, copolymers such as ethylene/acrylic acid copolymer and ethylene/methacrylic acid copolymer.

In general, the molecular weight of the polymeric carboxylic acids is in the range of from 1000 to 30000 g/mol, preferably 1000 to 10 000 g/mol. The molecular weight is measured by the gel permeation chromatography method (GPC) as indicated in detail in the experimental part.

Phosphonates, which comprise two or three phosphonate groups and no carboxyl groups are preferably 1-hydroxyethylidene-1,1-diphosphonic acid (HEDP), amino-tris(methylenephosphonic acid) (ATMP) or [[(2-hydroxyethyl)imino]bis(methylene)]bisphosphonic acid and mixtures thereof. The respective chemical formulae of the preferred di- or triphosphonates are given in the following:

(HEDP)             (ATMP)

[[(2-hydroxyethyl)imino]bis(methylene)]bisphosphonic Acid

The phosphonates are retarders for cementitious systems and have the advantage that they are efficient in prolonging the open time.

Suitable $\alpha$-hydroxy carboxylic acids or salts thereof include tartaric acid, citric acid, glycolic acid, gluconic acid, and their salts and mixtures thereof. Sodium gluconate is particularly preferred.

In a preferred embodiment, the compound D is a $\alpha$-hydroxy carboxylic acids or salts thereof, preferably gluconic acid or a salt thereof. Sodium gluconate is particularly preferred.

Suitable polyhydroxy compounds with a carbon to oxygen ratio of C/O>1.5 include diethanolamine, methyl diethanolamine, butyl diethanolamine, monoisopropanolamine, diisopropanolamine, methyl diisopropanolamine, triethanolamine, tetrahydroxypropylethylenediamine, trimethylaminoethylethanolamine, N,N-bis(2-hydroxyethyl)isopropanolamine, N,N,N'-trimethylaminoethylethanolamine, and N,N,N',N'-tetrakis(2-hydroxypropyl)ethylenediamine and polyvinylalcohol and condensation products thereof.

The weight ratio of component a) to component d) is in general in the range from about 10:1 to about 1:10, preferably about 5:1 to about 1:5 or about 3:1 to about 1:1.

In one embodiment, the mixture of the invention further comprises e) at least one dispersant, which is selected from comb polymers having a carbon-containing backbone to which are attached pendant cement-anchoring groups and polyether side chains, non-ionic comb polymers having a carbon-containing backbone to which are attached pendant hydrolysable groups and polyether side chains, the hydrolysable groups upon hydrolysis releasing cement-anchoring groups, sulfonated melamine-formaldehyde condensates, lignosulfonates, sulfonated ketone-formaldehyde condensates, sulfonated naphthalene-formaldehyde condensates, phosphonate containing dispersants, preferably the phosphonate containing dispersants comprise at least one polyalkylene glycol unit, cationic (co)polymers, and mixtures thereof.

In an embodiment, the dispersant is a comb polymer having a carbon-containing backbone to which are attached pendant cement-anchoring groups and polyether side chains. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

Preferably, the structural unit comprising anionic and/or anionogenic groups is one of the general formulae (Ia), (Ib), (Ic) and/or (Id):

Ia $$-\left(\begin{matrix} H \\ | \\ C \\ | \\ H \end{matrix} - \begin{matrix} R^1 \\ | \\ C \\ | \\ C=O \\ | \\ X \\ | \\ R^2 \end{matrix}\right)-$$

wherein $R^1$ is H, $C_1$-$C_4$ alkyl, $CH_2COOH$ or $CH_2CO$—X—$R^3$, preferably H or methyl;

X is NH—($C_nH_{2n}$) or O—($C_nH_{2n}$) with n=1, 2, 3 or 4, or a chemical bond, the nitrogen atom or the oxygen atom being bonded to the CO group;

$R^2$ is $PO_3M_2$ or O—$PO_3M_2$; or, if X is not present, $R^2$ is OM;

$R^3$ is $PO_3M_2$, or O—$PO_3M_2$;

Ib $$-\left(\begin{matrix} H \\ | \\ C \\ | \\ H \end{matrix} - \begin{matrix} R^3 \\ | \\ C \\ | \\ (C_nH_{2n})\text{—}R^4 \end{matrix}\right)-$$

wherein $R^3$ is H or $C_1$-$C_4$ alkyl, preferably H or methyl;

n is 0, 1, 2, 3 or 4;

$R^4$ is $PO_3M_2$, or O—$PO_3M_2$;

Ic $$-\left(\begin{matrix} H \\ | \\ C \\ | \\ O=C \end{matrix} - \begin{matrix} R^5 \\ | \\ C \\ | \\ C=O \\ \diagdown Z \diagup \end{matrix}\right)-$$

wherein $R^5$ is H or $C_1$-$C_4$ alkyl, preferably H;

Z is O or $NR^7$;

$R^7$ is H, ($C_nH_{2n}$)—OH, ($C_nH_{2n}$)—$PO_3M_2$, ($C_nH_{2n}$)—$OPO_3M_2$, ($C_6H_4$)—$PO_3M_2$, or ($C_6H_4$)—$OPO_3M_2$, and n is 1, 2, 3 or 4;

Ic $$-\left(\begin{matrix} H \\ | \\ C \\ | \\ O=C \\ | \\ Q \\ | \\ R^7 \end{matrix} - \begin{matrix} R^6 \\ | \\ C \\ | \\ C=O \\ | \\ OM \end{matrix}\right)-$$

wherein $R^6$ is H or $C_1$-$C_4$ alkyl, preferably H;

Q is $NR^7$ or O;

$R^7$ is H, ($C_nH_{2n}$)—OH, ($C_nH_{2n}$)—$PO_3M_2$, ($C_nH_{2n}$)—$OPO_3M_2$, ($C_6H_4$)—$PO_3M_2$, or ($C_6H_4$)—$OPO_3M_2$, n is 1, 2, 3 or 4; and where each M independently is H or a cation equivalent.

Preferably, the structural unit comprising a polyether side chain is one of the general formulae (IIa), (IIb), (IIc) and/or (IId):

IIa $$-\left(\begin{matrix} R^{10} \\ | \\ C \\ | \\ R^{12} \end{matrix} - \begin{matrix} R^{11} \\ | \\ C \\ | \\ C_nH_{2n}\text{—}Z\text{—}E\text{—}G\text{—}(AO)_a\text{—}R^{13} \end{matrix}\right)-$$

wherein $R^{10}$, $R^{11}$ and $R^{12}$ independently of one another are H or $C_1$-$C_4$ alkyl, preferably H or methyl;

Z is O or S;

E is $C_2$-$C_6$ alkylene, cyclohexylene, $CH_2$—$C_6H_{10}$, 1,2-phenylene, 1,3-phenylene or 1,4-phenylene;

G is O, NH or CO—NH; or

E and G together are a chemical bond;

A is $C_2$-$C_5$ alkylene or $CH_2CH(C_6H_5)$, preferably $C_2$-$C_3$ alkylene;

n is 0, 1, 2, 3, 4 or 5;

a is an integer from 2 to 350, preferably 10 to 150, more preferably 20 to 100;

$R^{13}$ is H, an unbranched or branched $C_1$-$C_4$ alkyl group, CO—$NH_2$ or $COCH_3$;

IIb $$-\left(\begin{matrix} R^{16} \\ | \\ C \\ | \\ R^{18} \end{matrix} - \begin{matrix} R^{17} \\ | \\ C \\ | \\ (C_nH_{2n})\text{—}O\text{—}E\text{—}N\text{—}(AO)_a\text{—}R^{19} \\ | \\ (LO)_d\text{—}R^{20} \end{matrix}\right)-$$

wherein $R^{16}$, $R^{17}$ and $R^{18}$ independently of one another are H or $C_1$-$C_4$ alkyl, preferably H;

E is $C_2$-$C_6$ alkylene, cyclohexylene, $CH_2$—$C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene;

n is 0, 1, 2, 3, 4 and/or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl;

$R^{20}$ is H or $C_1$-$C_4$ alkyl; and n is 0, 1, 2, 3, 4 or 5;

IIc $$-\left(\begin{bmatrix} R^{21} \\ | \\ C \\ | \\ R^{23} \end{bmatrix} - \begin{matrix} R^{22} \\ | \\ C \\ | \\ C\text{—}W\text{—}(AO)_a\text{—}R^{24} \\ \| \\ O \end{matrix}\right]_V -$$

wherein $R^{21}$, $R^{22}$ and $R^{23}$ independently are H or $C_1$-$C_4$ alkyl, preferably H;

W is O, $NR^{25}$, or is N;

V is 1 if W=O or $NR^{25}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

IId wherein $R^6$ is H or $C_1$-$C_4$ alkyl, preferably H;

Q is $NR^{10}$, N or O;

V is 1 if W=O or $NR^{10}$ and is 2 if W=N;

$R^{10}$ is H or $C_1$-$C_4$ alkyl;

A is $C_2$-$C_5$ alkylene or $CH_2CH(C_6H_5)$, preferably $C_2$-$C_3$ alkylene; and a is an integer from 2 to 350, preferably 10 to 150, more preferably 20 to 100.

The molar ratio of structural units (I) to structural units (II) varies from 1/3 to about 10/1, preferably 1/1 to 10/1, more preferably 3/1 to 6/1. The polymeric dispersants comprising structural units (I) and (II) can be prepared by conventional methods, for example by free radical polymerization. The preparation of the dispersants is, for example, described in EP0894811, EP1851256, EP2463314, and EP0753488.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

III wherein

T is phenyl, naphthyl or heteroaryl having 5 to 10 ring atoms, of which 1 or 2 atoms are heteroatoms selected from N, O and S;

n is 1 or 2;

B is N, NH or O, with the proviso that n is 2 if B is N and n is 1 if B is NH or O;

A is an $C_2$-$C_5$ alkylene or $CH_2CH(C_6H_5)$;

a is an integer from 1 to 300;

$R^{25}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb):

IVa wherein

D is phenyl, naphthyl or heteroaryl having 5 to 10 ring atoms, of which 1 or 2 atoms are heteroatoms selected from N, O and S;

E is N, NH or O, with the proviso that m is 2 if E is N and m is 1 if E is NH or O;

A is $C_2$-$C_5$ alkylene or $CH_2CH(C_6H_5)$;

b is an integer from 0 to 300;

M independently is H or a cation equivalent;

IVb wherein

V is phenyl or naphthyl and is optionally substituted by 1 to 4 radicals, preferably two radicals selected from $R^8$, OH, $OR^8$, $(CO)R^8$, COOM, $COOR^8$, $SO_3R^8$ and $NO_2$;

$R^7$ is COOM, $OCH_2COOM$, $SO_3M$ or $OPO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) products are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to acid groups upon exposure to water, and the resulting acid functional groups will then form complexes with the cement component.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA 2 172 004 A1, DE 44 1 1 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melamine-sulfonate-formaldehyde condensates encompass (greatly simplified and idealized) units of the formula in which n stands generally for 10 to 300. The molar weight is situated preferably in the range from 2500 to 80 000. Additionally to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by BASF Construction Solutions GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula where n stands generally for 5 to 500. Lignosulfonates have molar weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024:

where m and n are generally each 10 to 250, M is an alkali metal ion, such as Na+, and the ratio m:n is in general in the range from about 3:1 to about 1:3, more particularly about 1.2:1 to 1:1 0.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable acetone-formaldehyde condensates are the Melcret K1L products distributed by BASF Construction Solutions GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula Typically, molar weights (Mw) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable β-naphthalene-formaldehyde condensates are the Melcret 500 L products distributed by BASF Construction Solutions GmbH.

Generally, phosphonate containing dispersants incorporate phosphonate groups and polyether side groups.

Suitable phosphonate containing dispersants are those according to the following formula $$R\text{—}(OA)_n\text{-N—}[CH_2\text{—}PO(OM_2)_2]_2$$

wherein

R is H or a hydrocarbon residue, preferably a $C_1$-$C_{15}$ alkyl radical,

A is independently $C_2$-$C_{18}$ alkylene, preferably ethylene and/or propylene, most preferably ethylene, n is an integer from 5 to 500, preferably 10 to 200, most preferably 10 to 100, and M is H, an alkali metal, 1/2 earth alkali metal and/or an amine.

Useful as dispersant are also cationic (co)polymers. The cationic (co)polymers comprise preferably a) 3 to 100 mol-%, preferably 10 to 90 mol %, more preferably 25 to 75 mol % of a cationic structural unit of formula (V)

wherein $R^1$ in each occurrence is the same or different and represents hydrogen and/or methyl, $R^2$ in each occurrence is the same or different and is selected from the group consisting of:

wherein $R^3$, $R^4$ and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, l in each occurrence is the same or different and represents an integer from 0 to 2, m in each occurrence is the same or different and represents 0 or 1, n in each occurrence is the same or different and represents an integer from 0 to 10, Y in each occurrence is the same or different and represents an absent group, oxygen, NH and/or $NR^3$, V in each occurrence is the same or different and represents $—(CH_2)_x—$, , and/or

, wherein x in each occurrence is the same or different and represents an integer from 0 to 6, and ($X^-$) in each occurrence is the same or different and represents a halogenide ion, a $C_{1-4}$-alkyl sulfate, a $C_{1-4}$-alkyl sulfonate, a $C_{6-14}$-(alk)aryl sulfonate and/or a monovalent equivalent of a polyvalent anion, which is selected from a sulfate, a disulfate, a phosphate, a diphosphate, a triphosphate and/or a polyphosphate.

Preferably the cationic (co)polymers comprises b) from 0 to 97 mol-%, preferably 10 to 90 mol %, more preferably 25 to 75 mol %, of a macromonomeric structural unit of formula (VI)

$$—CH_2—CR^1—$$
$$(CH_2)_l$$
$$(CO)_m$$
$$Y$$
$$V$$
$$R^6$$

(VI)

wherein $R^6$ in each occurrence is the same or different and represents a polyoxyalkylene group of the following formula (V111

(VII)

wherein in each occurrence is the same or different and represents an integer from 1 to 300, and $R^1$, $R^3$, l, m, Y, V, and x have the meanings given above, provided that, in both structural units (V) and (VI), Y represents an absent group when x is =0.

Preferably in the cationic (co)polymer the monomer components corresponding to the structural unit (V) are selected from quaternized N-vinylimidazole, quaternized N-allylimidazole, quaternized 4-vinylpyridine, quaternized 1-[2-(acryloyloxy)ethyl]-1H-imidazole, 1-[2-(methacryloyloxy) ethyl]-1H-imidazole, and mixtures thereof.

Preferably in the cationic (co)polymer the monomer components corresponding to the structural unit (VI) are selected from vinyl ethers, vinyloxy $C_{1-6}$-alkyl ethers, in particular vinyloxy butyl ethers, allyl ethers, methallyl ethers, 3-butenyl ethers, isoprenyl ethers, acrylic esters, methacrylic esters, acrylamides, methacrylamides, and mixtures thereof.

In the cationic (co)polymer o is preferably from 5 to 300, more preferably 10 to 200, and in particular 20 to 100.

In the cationic (co)polymer the oxyalkylene units of the polyoxyalkylene group of formula (VII) are preferably selected from ethylene oxide groups and/or propylene oxide groups, which are arranged randomly, alternatingly, graduatedly and/or blockwise within the polyoxyalkylene group.

The cationic (co)polymer is preferably characterized in that the polyoxyalkylene group of formula (VII) is a mixture with different values for o within the specified definition.

Preferable is the cationic (co)polymer comprising 10 to 90 mol-% of the cationic structural unit and 90 to 10 mol-% of the macromonomeric structural unit, preferably 25 to 75 mol-% of the cationic structural unit and 75 to 25 mol-% of the macromonomeric structural unit.

Preferably, the cationic (co)polymer has a molecular weight in the range of from 1000 to 500000, more preferably 2000 to 150000 and in particular 4000 to 100000 g/mol. Preferably, the molecular weight is determined by the gel permeation chromatography method (GPC) as indicated in the experimental part.

The cationic (co)polymers are particularly useful for dispersing aqueous suspensions of binders selected from the group comprising hydraulic binders and/or latent hydraulic binders. The latent hydraulic binder is preferably blast furnace slag.

The mixture according to the invention can be present as a solution or dispersion, in particular an aqueous solution or dispersion. The solution or dispersion suitably has a solids content of 10 to 50% by weight, in particular 25 to 35% by weight. Alternatively, the mixture according to the invention can be present as a powder which is obtainable, e.g., by drum-drying, spray drying or flash-drying. The mixture according to the invention may be introduced into the mixing water or introduced during the mixing of the mortar or concrete. The dosage of the mixture of the invention in weight % of inorganic binder is preferably from 0.05 to 5%.

The present invention also relates to a construction material composition comprising at least one inorganic binder and the mixture according to the invention. In a preferred embodiment, the construction material composition comprises the mixture according to the invention in an amount of from 0.05 to 5% by weight of the inorganic binder.

The inorganic binder may be a hydraulic binder, a latent hydraulic binder, a calcium sulfate based binder, or a mixture thereof.

Suitable hydraulic binders include Portland cement, calcium aluminate cement, sulfoaluminate cement, and mixtures thereof.

The mineralogical phases are indicated by their usual name followed by their cement notation. The primary compounds are represented in the cement notation by the oxide varieties: C for CaO, S for $SiO_2$, A for $Al_2O_3$, \$ for $SO_3$, H for $H_2O$; this notation is used throughout.

The term "Portland cement" denotes any cement compound containing Portland clinker, especially CEM I, II, III, IV and V within the meaning of standard EN 197-1, paragraph 5.2. A preferred cement is ordinary Portland cement (OPC) according to DIN EN 197-1 which may either contain calcium sulfate (<7% by weight) or is essentially free of calcium sulfate (<1% by weight).

Calcium aluminate cement (also referred to as high aluminate cement) means a cement containing calcium aluminate phases. The term "aluminate phase" denotes any mineralogical phase resulting from the combination of aluminate (of chemical formula $Al_2O_3$, or "A" in cement notation), with other mineral species. The amount of alumina (in form of $Al_2O_3$) is $\geq 30\%$ by weight of the total mass of the aluminate-containing cement as determined by means of X-ray fluorescence (XRF). More precisely, said mineralogical phase of aluminate type comprises tricalcium aluminate ($C_3A$), monocalcium aluminate (CA), mayenite ($C_{12}A_7$), tetracalcium aluminoferrite ($C_4AF$), or a combination of several of these phases.

Sulfoaluminate cement has a content of yeelimite (of chemical formula $4CaO \cdot 3Al_2O_3 \cdot SO_3$ or $C_4A_3\$$ in cement notation) of greater than 15% by weight.

In one preferred embodiment, the inorganic binder is a hydraulic binder, which is selected from Portland cement, calcium aluminate cement, sulfoaluminate cement, and mixtures thereof. In another preferred embodiment, the inorganic binder comprises a mixture of Portland cement and aluminate cement, or a mixture of Portland cement and sulfoaluminate cement or a mixture of Portland cement, aluminate cement and sulfoaluminate cement.

In an embodiment, where the construction chemical composition contains an aluminate-containing cement, the compositions may additionally contain at least one sulfate source, preferably calcium sulfate source. The calcium sulfate source may be selected from calcium sulfate dihydrate, anhydrite, $\alpha$- and $\beta$-hemihydrate, i.e. $\alpha$-bassanite and $\beta$-bassanite, or mixtures thereof. Preferably the calcium sulfate is $\alpha$-bassanite and/or $\beta$-bassanite. In general, calcium sulfate is comprised in an amount of about 1 to about 20 weight %, based on the weight of the aluminate-containing cement. In a further embodiment, the construction chemical composition additionally contains at least one alkali metal sulfate like potassium sulfate or sodium sulfate, or aluminum sulfate.

Preferable are construction material compositions, which comprise a hydraulic binder and in which the weight percentage of sulfate with respect to the weight of clinker is from 4 to 14 weight %, preferably from 8 to 14 weight % most preferably from 9 to 13 weight %. The mass of sulfate is to be understood as the mass of the sulfate ion without the counterion. Preferably the sulfate is present in the form of calcium sulfate, more preferably in the form of $\alpha$-bassanite and/or $\beta$-bassanite.

Addition of sulphate to hydraulic binders (cements), which are poor in the contents of sulphate helps to encourage the formation of ettringite and leads to a better early strength development.

The construction chemical compositions or building material formulations may also contain latent hydraulic binders and/or pozzolanic binders. For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2 \, kg^{-1}$ preferably from 300 to 600 $m^2 \, kg^{-1}$ Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m_2 \, g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 10 to 30 $m^2 \, g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

A particularly suitable latent hydraulic binder is blast furnace slag.

In one preferred embodiment of the invention, the inorganic binder is a latent hydraulic binder, which is preferably blast furnace slag.

The latent hydraulic binder is, in general, comprised in an amount in the range from about 1 to about 30 wt %, based on the weight of the aluminate-containing cement.

In case construction material composition contain low amount of hydraulic binder (e.g. 10%) an alkaline activator can be further added to promote strength development. Alkaline activators are preferably used in the binder system, such alkaline activators are for example aqueous solutions of alkali metal fluorides, alkali metal hydroxides, alkali metal aluminates or alkali metal silicates, such as soluble water-glass, and mixtures thereof.

The construction chemical compositions or building material formulations may also contain a calcium sulfate based binder.

In one preferred embodiment, the inorganic binder is a calcium sulfate based binder, which is selected from calcium sulfate dihydrate, calcium sulfate hemihydrate, anhydrite, and mixtures thereof.

The construction material composition can be for example concrete, mortar, cement paste or grouts. The term "cement paste" denotes the inorganic binder composition admixed with water.

The term "mortar" or "grout" denotes a cement paste to which are added fine granulates, i.e. granulates whose diameter is between 150 μm and 5 mm (for example sand), and optionally very fine granulates. A grout is a mixture of sufficiently low viscosity for filling in voids or gaps. Mortar viscosity is high enough to support not only the mortar's own weight but also that of masonry placed above it. The term "concrete" denotes a mortar to which are added coarse granulates, i.e. granulates with a diameter of greater than 5 mm.

The aggregate in this invention can be for example silica, quartz, sand, crushed marble, glass spheres, granite, limestone, sandstone, calcite, marble, serpentine, travertine, dolomite, feldspar, gneiss, alluvial sands, any other durable aggregate, and mixtures thereof. The aggregates are often also called fillers and in particular do not work as a binder.

The present invention also relates to the use of the mixture according to the invention for modifying the hardening of inorganic binder containing building material formulations, and/or for producing building products, in particular for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, 3D printed concrete, concrete repair systems, industrial cement flooring, one-component and two-component sealing slurries, slurries for ground or rock improvement and soil conditioning, screeds, filling and self-levelling compositions, such as joint fillers or self-levelling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, mortars, such as dry mortars, sag resistant, flowable or self-levelling mortars, drainage mortars, or repair mortars, grouts, such as joint grouts, non-shrink grouts, tile grouts, injection grouts, windmill grouts, anchor grouts, flowable or self-levelling grouts, ETICS (external thermal insulation composite systems), EIFS grouts (Exterior Insulation Finishing Systems), swelling explosives, waterproofing membranes or cementitious foams.

The present invention is further illustrated by the following examples.

EXAMPLES

Preparation of Glyoxylic Acid Addition or Condensation Products and Dispersants

Retardant 1:

148 g glyoxylic acid hydrate (50% in water) were charged into a reaction vessel and mixed with 594 g ethanol. 380 g sodium pyrosulfite ($Na_2S_2O_5$) dissolved in 750 g of water were then added to the mixture. After stirring for 4 h the obtained suspension was cooled to 1° C. and allowed to stand for 24 h. The product crystallized and was isolated and dried. It was characterized by means of NMR.

Retardant 2:

14.81 g Glyoxylic acid (50% solution in water) was added into a vessel and neutralized to a pH of 5 with potassium hydroxide. After adding 10.0 g urea, the mixture was heated to 80° C. After 7 h, the highly viscous substance was analyzed by gel permeation chromatography method (GPC) as described below. The molecular weight was $M_w=1500$ g/mol.

Dispersant 1: The dispersant is a Polycarboxylic ether, more specifically a copolymer of 4-hydroxybutyl monovinyl ether ethoxylated with 64 moles of ethylene oxide in average and acrylic acid in a ratio of 1/10.

Gel Permeation Chromatography Method (GPC):

Column combination: OH-Pak SB-G, OH-Pak SB 804 HQ and OH-Pak SB 802.5 HQ by Shodex, Japan; eluent: 80 Vol.-% aqueous solution of $HCO_2N$ $H_4$ (0.05 mol/l) and 20 vol.-% methanol; injection volume 100 μl; flow rate 0.5 ml/min. The molecular weight calibration was performed with poly(acrylate) standards for the RI detector. Standards were purchased from PSS Polymer Standards Service, Germany.

Example 1

The following additives were used: As a reference, Retardant 1 was used alone (Ex.-No. Ref-1). Furthermore, Retardant 1 was used as a mixture with glycerol in a weight ratio of 4:1 (Ex.-No. 1).

The additive was added to dry mortar mixture comprising 1100 g Portland cement and 1650 g sand according to DIN EN 196-1 available from Normensand GmbH. After adding the mixing water (w/c=0.35), the mortar mixture was mixed analogous to DIN EN 196-1 in a Toni-Mixer as follows:

0-60 s: Rilem level 1
60-90 s: Rilem level 2
90-180 s: Pause
180-240 s: Rilem level 2

The compressive strength was measured after 3 h and 24 h at 4×4 cm prisms. At each time 3 prisms were tested and the average of the values was calculated.

The results are shown in the following table 1.

TABLE 1

| Ex.-No. | Additive | Compressive strength [MPa] | |
| --- | --- | --- | --- |
| | | 3 h | 24 h |
| Ref-1 | 2% Retardant 1 | 2.1 | 7.8 |
| 1 | 2% Retardant 1 + 0.5% glycerol | 4.5 | 12.8 |

The early compressive strength and the final compressive strength is improved in case of the additive comprising the Retardant 1 and glycerol in comparison to the use of Retardant 1 alone.

Example 2

The effect of polyhydroxy compounds in an additive is demonstrated in a mortar with the following recipe according to Table 2. Water to cement ratio is w/c=0.37. The weight percent amount of the compounds used as additive is provided in Table 3.

TABLE 2

| Mortar ingredient | Amount |
| --- | --- |
| Fillers Calcit MS-12 Pa. 1 | 134.43 g |
| CEM I 42.5R | 1075.44 g |
| Quarz 0.1/0.3 | 250.22 g |
| Quarz 0.3/1 | 200.17 g |
| Sand 0/4 | 2175.13 g |
| Splitt 2/5 | 565.00 g |

The cement mortar was prepared in a 5 L RILEM mixer. The mixer was charged with cement, aggregate and sand. Thereafter, mixing was started at low speed (140 rpm). After 30 s mixing water and the therein dissolved additives was uniformly added to the mixture. The mixing speed was then increased (285 rpm) and continued for 90 s.

The slump was determined using a cone with height of 15 cm and an internal diameter at the top of 5 cm and 10 cm at the bottom. The cone is completely filled immediately after mixing, the cone is lifted, and the slump of the concrete measured. Furthermore the compressive strength was measured as described in Example 1. The results are provided in Table 3.

TABLE 3

| Dispersant 1 | Retardant 2 | Na₂CO₃ | Na-Gluconate | Glycerol | Slump flow | | Compressive Strength [MPa] | | |
| --- | --- | --- | --- | --- | --- | --- | --- | --- | --- |
| | | | | | 5 min | 15 min | 2 h | 5 h | 24 h |
| 0.1% | 0.3% | 0.50% | 0.10% | 0.00% | 12 | 12 | 4.7 | 5.9 | 15 |
| 0.1% | 0.3% | 0.50% | 0.10% | 0.2% | 11.6 | 10.2 | 6.4 | 6.4 | 17.8 |

The addition of glycerol improves early strength of the mortar by up to 30%.

The invention claimed is:

1. A construction material composition comprising at least one inorganic binder and a mixture comprising;
  a) at least one compound A selected from the group consisting of glyoxylic acid, salts thereof, condensation or addition products of glyoxylic acid or salts thereof, and mixtures thereof;
  b) at least one polyhydroxy compound B and/or salts or saturated or unsaturated $C_1$-$C_{20}$-carboxylic acid esters thereof, wherein the polyhydroxy compound B is selected from the group consisting of polyalcohols with a carbon to oxygen ratio of from $C/O \geq 1$ to $C/O \leq 1.5$ and mixtures thereof; and
  c) at least one compound C selected from:
    i) a borate source,
    ii) a carbonate source, wherein the carbonate source is selected from inorganic carbonates and organic carbonates,
    and mixtures thereof.

2. The construction material composition according to claim 1, wherein the compound A is selected from

A1)

A2)

and
  A3) an amine-glyoxylic acid condensate selected from the group consisting of a melamine-glyoxylic acid condensate, an urea-glyoxylic acid condensate, a melamine-urea-glyoxylic acid condensate and a polyacrylamide-glyoxylic acid condensate;
and mixtures thereof;
wherein X is in each case independently selected from H or a cation equivalent Ka, wherein K is an alkali metal, alkaline earth metal, zinc, iron, aluminium, ammonium, or a phosphonium cation, and wherein a is 1/n, wherein n is the valence of the cation.

3. The construction material composition according to claim 1, wherein the polyhydroxy compound B is selected from polyalcohols with a carbon to oxygen ratio of from $C/O \geq 1$ to $C/O \leq 1.25$, and mixtures thereof.

4. The construction material composition according to claim 1, wherein the polyhydroxy compound B is selected from sugar alcohols and their condensation products, alkanolamines and their condensation products, carbohydrates, pentaerythritol, trimethylolpropane, and mixtures thereof.

5. The construction material composition according to claim 1, wherein the polyhydroxy compound B has a molecular weight of from 62 g/mol to 25000 g/mol.

6. The construction material composition according to claim 1, wherein the compound(s) A and the compound(s) B are present in a weight ratio of from 10:1 to 1:10.

7. The construction material composition according to claim 1, wherein the compound C is an inorganic carbonate.

8. The construction material composition according to claim 1, wherein the mixture further comprises d) at least one compound D, which is selected from polycarboxylic acids or salts thereof whose milliequivalent number of carboxyl groups is 5.00 meq/g or higher, assuming all the carboxyl groups to be in unneutralized form;

phosphonates which comprise two or three phosphonate groups and no carboxyl groups; and α-hydroxy carboxylic acids or salts thereof;

a polyhydroxy compound with a carbon to oxygen ratio of C/O>1.5;

and mixtures thereof.

9. The construction material composition according to claim 8, wherein the compound D is a α-hydroxy carboxylic acids or salts thereof.

10. The construction material composition according to claim 1, wherein the mixture further comprises e) at least one dispersant, which is selected from comb polymers having a carbon-containing backbone to which are attached pendant cement-anchoring groups and polyether side chains, non-ionic comb polymers having a carbon-containing backbone to which are attached pendant hydrolysable groups and polyether side chains, the hydrolysable groups upon hydrolysis releasing cement-anchoring groups, sulfonated melamine-formaldehyde condensates, lignosulfonates, sulfonated ketone-formaldehyde condensates, sulfonated naphthalene-formaldehyde condensates, phosphonate containing dispersants, cationic (co)polymers, and mixtures thereof.

11. The construction material composition according to claim 1, wherein the inorganic binder is a hydraulic binder, which is selected from Portland cement, calcium aluminate cement, sulfoaluminate cement, and mixtures thereof.

12. The construction material composition according to claim 1, wherein the inorganic binder is a latent hydraulic binder.

13. The construction material composition according to claim 1, wherein the polyhydroxy compound B is glycerol.

14. The construction material composition according to claim 1, wherein the polyhydroxy compound B has a molecular weight of from 62 g/mol to 10000 g/mol.

15. The construction material composition according to claim 1, wherein the polyhydroxy compound B has a molecular weight of from 62 g/mol to 1000 g/mol.

16. The construction material composition according to claim 1, wherein the compound(s) A and the compound(s) B are present in a weight ratio of from 1:1 to 1:8.

17. A mixture comprising a) at least one compound A selected from an amineglyoxylic acid condensate selected from the group consisting of a melamine-glyoxylic acid condensate, an urea-glyoxylic acid condensate, a melamine-urea-glyoxylic acid condensate, a polyacrylamide-glyoxylic acid condensate, and mixtures thereof; and b) at least one polyhydroxy compound B and/or salts or saturated or unsaturated $C_1$-$C_{20}$-carboxylic acid esters thereof, wherein the polyhydroxy compound B is selected from polyalcohols with a carbon to oxygen ratio of from C/O≥1 to C/O≤1.5 and mixtures thereof; and c) at least one compound C selected from:

i) a borate source, ii) a carbonate source, wherein the carbonate source is selected from inorganic carbonates and organic carbonates, and mixtures thereof.

18. The use of the mixture as defined in claim 17 for modifying the hardening of inorganic binder containing building material formulations, and/or for producing building products.

\* \* \* \* \*